United States Patent
Gargi

(10) Patent No.: US 8,473,981 B1
(45) Date of Patent: Jun. 25, 2013

(54) AUGMENTING METADATA OF DIGITAL MEDIA OBJECTS USING PER OBJECT CLASSIFIERS

(75) Inventor: Ullas Gargi, Los Altos, CA (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 13/174,548

(22) Filed: Jun. 30, 2011

(51) Int. Cl.
*G06F 13/00* (2006.01)

(52) U.S. Cl.
USPC .......... 725/40; 725/44; 725/45; 725/46; 725/47

(58) Field of Classification Search
USPC .............................. 725/40, 44–47
See application file for complete search history.

(56) References Cited

U.S. PATENT DOCUMENTS

| | | | |
|---|---|---|---|
| 7,072,846 B1 | 7/2006 | Robinson | |
| 7,853,071 B2 | 12/2010 | Friedhoff et al. | |
| 2002/0112239 A1 | 8/2002 | Goldman | |
| 2004/0025180 A1* | 2/2004 | Begeja et al. | 725/46 |
| 2006/0161952 A1 | 7/2006 | Herz et al. | |
| 2007/0136753 A1 | 6/2007 | Bovenschulte et al. | |
| 2009/0172730 A1* | 7/2009 | Schiff et al. | 725/34 |

OTHER PUBLICATIONS

Aggarwal, C., et al., "Horting Hatches an Egg: A New Graph-Theoretic Approach to Collaborative Filtering," In Proceedings of the Fifth ACM SIGKDD International Conference on Knowledge discovery and data mining, 1999, 12 Pages.

Baluja, S., et al., Video Suggestion and Discovery for YouTube: Taking Random Walks Through the View Graph, International World Wide Web Conference Committee (IW3C2) 2008, Apr. 21-25, 2008, Beijing, China, 10 Pages.

Herlocker, J., et al., "Explaining Collaborative Filtering Recommendations," CSCW'00, Dec. 2-6, 2000, 10 Pages.

Vallet, D., et al., "Use of Implicit Graph for Recommending Relevant Videos: A Simulated Evaluation," Lecture Notes in Computer Science, 2008, pp. 199-210.

* cited by examiner

*Primary Examiner* — Hunter B Lonsberry
(74) *Attorney, Agent, or Firm* — Fenwick & West LLP

(57) ABSTRACT

A metadata augmentation system trains individual classifiers associated with digital objects, such as digital videos. Textual features of the classifiers determined to be significant from the weights of the classifier are chosen to be added to the video as metadata.

15 Claims, 4 Drawing Sheets

Adding Metadata From Classifier Closeness

Extract Feature Vectors for Videos
410

Generate Classifiers for Videos
412

Perform Low Rank Approximation of Classifiers
414

Find Close Classifiers
416

Propagate Metadata
418

AUGMENTING METADATA OF DIGITAL MEDIA OBJECTS USING PER OBJECT CLASSIFIERS

BACKGROUND

1. Field of Art

The present invention generally relates to storage and manipulation of digital media content, and more specifically, to methods of augmenting the metadata of existing videos or other digital objects using classification models.

2. Background of the Invention

Video hosting services, such as YOUTUBE™, have become an increasingly popular way of sharing and viewing digital media such as videos, with users contributing tens of millions of videos each year. Accurate labeling of a video is of great value in such systems, permitting users to search for videos corresponding to given labels. Accurate labeling is also necessary for automated classification of videos into categories.

Unfortunately, the user-supplied label metadata is in many cases incomplete or inaccurate. For example, a user submitting a video might make unintentional errors such as misspellings when supplying label metadata in association with the video, or might fail to make the effort to provide much or any descriptive textual metadata. A user submitting a video might also intentionally provide false label metadata, e.g. as "spam" to induce other users to view the video. Thus, a user searching for a video representing a particular topic or concept might fail to find a relevant video because it lacked a description of the concept within its metadata, or might find a non-relevant video falsely labeled as representing the concept. In either case, the quality of the user's experience is significantly reduced.

SUMMARY

A metadata augmentation system uses a collection of individual classifiers, each of which is associated with a specific digital media object, to augment the metadata of the digital media objects. Augmentation includes adding textual labels to the metadata of the digital media objects based on textual features learned by their respective classifiers.

In one embodiment, the classifier for a given digital media object is trained using machine learning methods that learn features from a training set of digital media objects. The training set comprises digital media objects that are related to the given digital media object based on a measure of commonality. The learned features include both text features from labels included in the metadata of the training set, as well as features derived from the media (audio/visual) data for the objects. From the trained classifier for a given digital media object, the most significant textual features learned by the classifier are determined, and these textual features are applied as textual labels to the given digital media object. In an embodiment of the invention, textual features of the video are determined to be significant based upon the learned weights of the classifier.

In another embodiment, the metadata augmentation system identifies classifiers that are closely related based on the overall closeness of their weights. The classifiers can be compared for closeness using vector and matrix comparisons, clustering, and other methods. Given a set of two or more closely related classifiers, the system propagates the metadata, and preferably the textual labels, between the digital media objects associated with the related classifiers. The metadata augmentation system may build a low rank approximation of the classifiers associated with each digital media object to identify the classifiers that are closely related.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
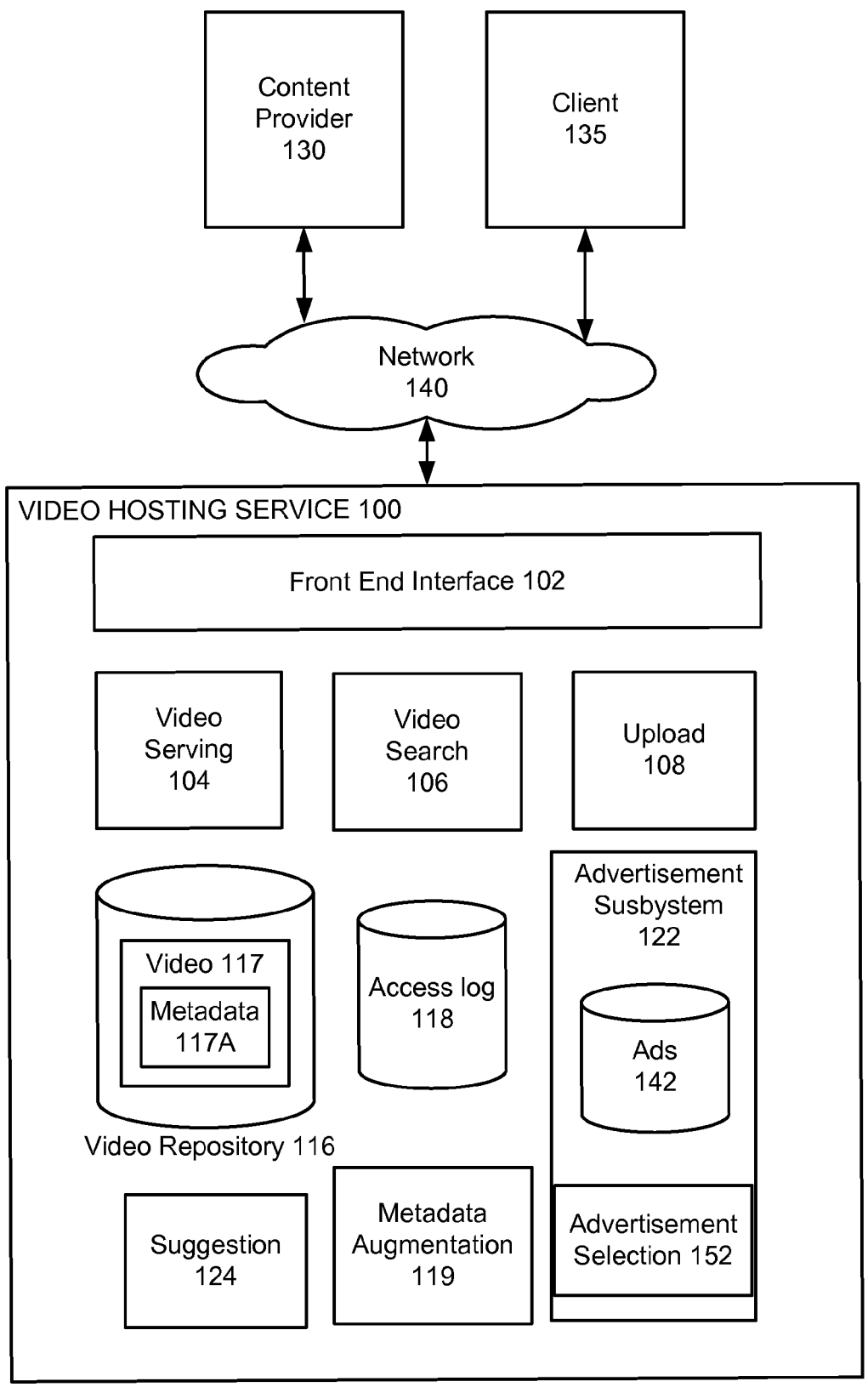
FIG. 1 is a block diagram of a video hosting service in which classifier training can be employed, according to one embodiment.

The metadata augmentation systems and methods described herein are broadly applicable to many different types of digital media objects for which metadata can be provided, such as video, audio, images, textual documents, multimedia documents, and the like. In order to provide a more concrete example, however, the below describes a metadata augmentation system oriented toward digital video. Thus, FIG. 1 is a block diagram of a video hosting service 100 in which metadata augmentation can be employed, according to one embodiment. The video hosting service 100 represents a service such as that of YOUTUBE™ that stores and provides videos to users via client devices 135. The video hosting service 100 communicates with a plurality of content providers 130 and client devices 135 via a network 140 to facilitate sharing of video content between users. The video data from the content providers 130, including both video content and associated metadata, serves as input that allows metadata to be added from one video to another. Note that for the sake of clarity FIG. 1 depicts only one instance of content provider 130 and client device 135, though there could be any number of each.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video. In particular, in editing the metadata, the content provider generally provides various textual information, including a description of the video, a title, and (optionally) one or more keywords or tags.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH™ player from Adobe Systems, Inc. or any other player adapted for the video file formats used in the video hosting service 100.

The network 140 represents the communication pathways between the content providers 130 and the clients 135. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The video hosting service 100 operates on the video data from the content providers 130 when augmenting video metadata. The video hosting service includes a front end interface 102, a video serving module 104, a video search module 106, an upload server 108, a video repository 116, and an access log 118. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website, found at www.youtube.com. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers."

The upload module 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as WebM, MPEG-2, MPEG-4, H.264, and the like. In addition to their audiovisual content, the videos 117 further have associated metadata 117A, e.g., textual metadata such as a title, description, and/or tags provided by a content provider 130 who provided (e.g., uploaded) the video.

In one embodiment, in addition to the textual metadata directly supplied by the user providing the video, the metadata 117A includes metadata derived from the user-supplied textual metadata. For example, the user-supplied textual metadata may be supplied to an algorithm that maps this textual metadata to a set weights associated with a set of respective clusters. Each cluster in turn is associated with a related set of keywords or terms. In one embodiment, the clusters are groups of textual words having some degree of semantic commonality, such as a cluster having the related words "lyrics song album lyric artist artists oh lirycs", or "hotels hotel accommodation accommodation bed-and-breakfast b&b cheap uk." For example, in one embodiment there are 500,000 clusters, and for a given video, the algorithm assigns a weight in the range [0, 1] relative to each cluster based on how strongly the textual metadata for the video is associated with that cluster. Further details on the mapping of textual metadata to weights associated with clusters are set forth in U.S. Pat. Nos. 7,231,393 and 7,383,258, both of which are incorporated by reference herein.

The access log 118 stores information describing each access to any video by any viewer. Thus, each video effectively has an associated list of viewers. Each individual viewer is assigned an ID, for example, based on his or her IP address to differentiate the individual viewers. In one embodiment, this viewer ID is an anonymized viewer ID that is assigned to each individual viewer to keep viewer identities private, such as an opaque identifier such as a unique random number or a hash value. The system then can access each viewer's demographic information without obtaining his or her identity. In an alternative embodiment, the actual identity of the viewers may be known or determinable, in any case, for each viewer, the access log 118 tracks the viewer's interactions with videos. In one embodiment, each entry in the access log 118 identifies a video being accessed, a time of access, an IP address of the viewer, a viewer ID if available, cookies, the viewer's search query or access path that led to the current access, and data identifying the type of interaction with the video. Interaction types can include any viewer interactions in the viewer interface of the website, such as playing, pausing, rewinding and forwarding a video. The various viewer interaction types are considered viewer events that are associated with a given video. For example, one entry might store that a viewer at a given IP address started viewing a particular video at time 0:00:00 and stopped viewing at time 0:34:29.

The video hosting service 100 further comprises a metadata augmentation system 119. In one embodiment, the metadata augmentation system 119 is part of the video hosting service 100, as depicted in FIG. 1. In another embodiment, the metadata augmentation system 119 is separate from the video hosting service 100, receiving input from it and providing output to it. The metadata augmentation system 119 is described in greater detail in FIG. 2.

The video hosting service 100 additionally comprises an advertisement subsystem 122, which uses machine learning methods to identify (e.g., predict, classify) advertisements that are optimal for a given video. The advertisement subsystem 122 may comprise in some embodiments a store of advertisements 142 (or other mechanism to access stored ads in third party repositories over the network) and advertisement selection 152 that implements machine learning methods to determine optimal advertisements for a given video. The machine learning methods may use the metadata associated with videos for training.

The suggestion server 124 generates a list of suggested (e.g., recommended, similarly, etc.) videos to present to a viewer. The metadata augmentation system 119 described later provides classifiers and features vectors as input to the suggestion server 124. The suggestion server 124 generates suggestions comprising a set of videos as output for a given input video. The classifier of an input video determines which feature vectors of the videos 117 are most closely related to the input video, and selects one or more of these related videos 117 for inclusion in the list of suggested videos.

The video hosting service 100 may be implemented using a single computer, or a network of computers, including cloud-based computer implementations. The computers are typically server class computers including one or more high-performance CPUs and 1G or more of main memory, as well as 500 Gb to 2Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data.

Metadata Augmentation System

Figure 2:
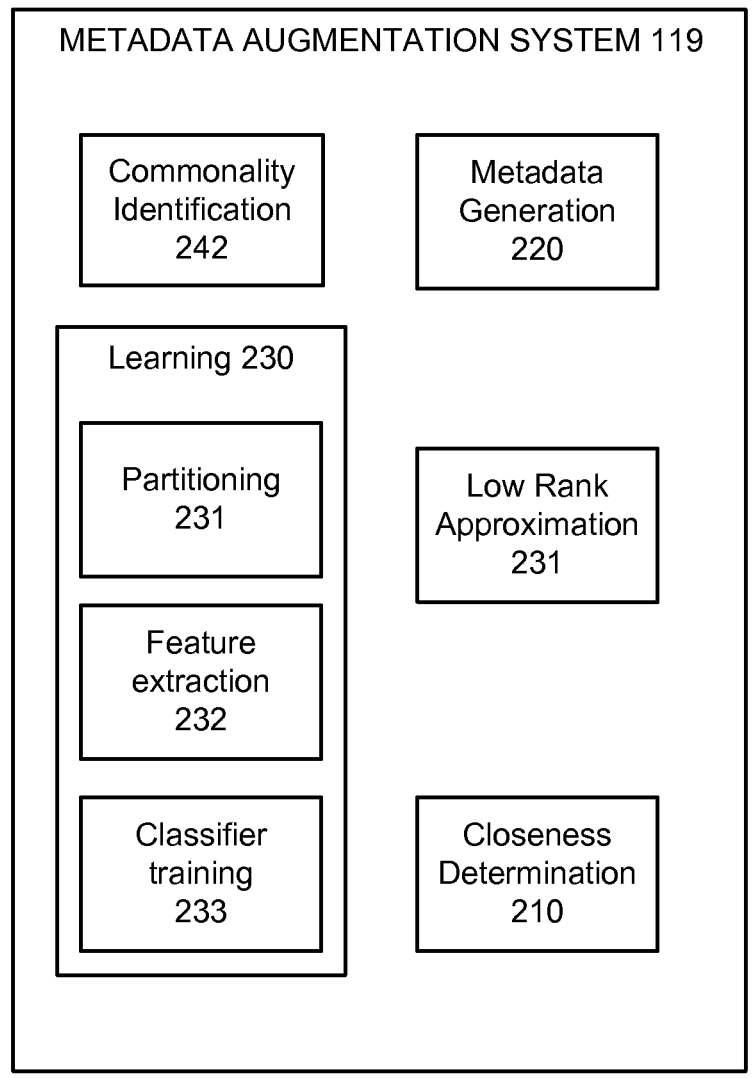
FIG. 2 illustrates the various components of a metadata augmentation system used to add metadata to a video or other digital object, according to one embodiment.

FIG. 2 illustrates the various components of the metadata augmentation system 119, according to one embodiment. The metadata augmentation module comprises commonality identification module 242 that determines a measure of commonality between pairs of digital objects, and is one means for performing this function. The commonality between a pair of videos may be representative of any common event or common feature between the pair of videos. The measure of commonality in one embodiment is derived from co-watch statistics for any two videos. Any two videos that are watched by a user within the same session are said to be "co-watched." In one embodiment, a session is defined as a 24-hour period, but different embodiments can define sessions using different time periods. The co-watch statistics may represent the number of times a pairs of videos were co-watched. The commonality identification module 242 may consult the access log 118 before computing co-watch statistics for a pair of videos. The measure of commonality may be raw co-watch count itself, or a value derived from the raw co-watch count, including normalized or standardized values, variances, distributions, or the like. Formally, the commonality identification module 242 may be characterized as providing an output $M_{i,j}$ representing the commonality measure for any two videos $V_i$ and $V_j$.

The learning module 230 trains individual a video classifier for each video, based on features of the video and a set of video determined to have at least a minimum measure of commonality, and is one means for performing this function. More specifically, each classifier provides an output representing a degree of similarity between the classifier's corresponding video and another video. Formally, a classifier $C_i$ for a video $V_i$ outputs a measure of similarity $S_{i,j}$ between $V_i$ and $V_j$.

More specifically, in one embodiment a partitioning module 231 partitions the videos 117, or some selected subset thereof, into training sets and validation sets, and further partitions both the training and validation sets into positive and negative training subsets. In one embodiment, the partitioning module 231 randomly selects a percentage (e.g. 15%) of videos to use as the validation set, and uses the remaining percentage (e.g., 85%) of the videos as the training set. Then, for each video V, the partitioning module 231 partitions both the training set and validation set into some positive subset of videos representing V and some negative subset of videos not representing V.

The determination of which videos 117 are placed in the positive training sets is based on the output of the commonality identification module 242. In one embodiment, the set of videos that are co-watched (i.e., more than zero co-watch events) with V are placed in the positive training subset or the positive validation subset. Alternatively, the selected videos may have a minimum commonality measure that represents at least a statistically significant number of co-watch events. A randomly selected set of videos not co-watched with V may be placed in the negative training subset or negative validation subset.

With the positive and negative training sets determined, a feature extraction module 232 derives relevant features from the various videos in the training sets, and is one means for performing this function. A classifier training module 233 then trains a classifier for each video V, based on the extracted features for the video and its training sets, and is one means for performing this function. Once trained, a classifier for given video V is enabled to the features of an arbitrary video as input and output a degree of similarity $S_{i,j}$ between that input video $V_i$ and video $V_j$. These modules are now described in further detail.

The feature extraction module 232 derives a feature vector F for each video V, comprising features from the videos of the training set, the feature vectors serving as descriptive representations of their respective videos for use in training the video classifiers. In one embodiment, the following features are derived:

Audiovisual features: A number of distinct types of features are extracted from the audiovisual content of the video itself, including:

- A histogram of local features sampled at sparse interest points using a Laplacian-of-Gaussian (LoG) or Scale Invariant Feature Transform (SIFT) feature extractor, with local descriptors being computed using Gabor wavelet responses at different orientations, spatial scales, and spatial offsets;
- A color histogram computed using hue and saturation in HSV color space;
- Motion rigidity features;
- Pornography detection features based on a boosting-based classifier in addition to frame-based pornography detection features;
- Audio features such as Stabilized Auditory Image (SAI) features and audio spectrogram;
- Color motion defined as the cosine distance of color histograms between two consecutive frames;
- Skin color features;
- Edge features using edges detected by a Canny edge detector in regions of interest;
- Line features using lines detected by a probabilistic Hough Transform;
- A histogram of textons;
- Entropy features for each frame using a normalized intensity histogram and entropy differences for multiple frames;
- Facial features such as a number of faces, or the size and aspect ratio of largest face region, with faces being detected by an extension of the AdaBoost classifier; and
- Shot boundary detection based features using differences of color histograms from consecutive frames.

Textual features: The feature extraction module 232 derives textual features from metadata of the videos in the training set. In one embodiment, the feature extraction module 232 infers likely clusters of words for the given textual metadata using Noisy-Or Bayesian networks. (For more details, see, for example, *Learning Bayesian Networks* by R. E. Neapolitan, Prentice Hall, 2003, which is hereby incorporated by reference.). The feature extraction module 232 may also use other methods for obtaining textual features, including forming a list of non-stop words in the metadata, and either all or a subset of such words based on, for example, term frequencies (e.g., TF-IDF) or other measures of term significance.

Co-watch features: The co-watch features describe other videos co-watched with the video. In one embodiment, the co-watch features comprise a list of the videos that were co-watched with the given video, and the associated normalized co-watch values. For example, the co-watch features for a video $V_i$ are $[v_{i0}, c_{i0}], [v_{i1}, c_{i1}], \ldots$ where $v_{in}$ is the normalized co-watch value and $c_{in}$ is an identifier of the other video in the pair with which the co-watch feature is associated.

It is appreciated that the above-described features are particularly suitable for characterizing the videos 117. In embodiments analyzing other types of digital objects, such as static images, audio files, or the like, a subset of the above-described features, or different types of features, may be suitable, as would be known to one of skill in the art. For example, in audio files, various types spectral analysis techniques (e.g., audio fingerprinting, MFCC analysis, etc.) may be used.

The combination of the various features extracted from a particular video e.g., concatenated in a specific order—serves as a feature vector that characterizes the video. The feature vectors for the videos of the training set and the validation set for a given video V are then used to train a video classifier for V and to validate the classifier's accuracy, as now further described.

The classifier training module 233 trains a separate classifier for each video $V_i$, based on the extracted features from the training sets. More specifically, for each video $V_i$, classifier training module 233 provides the feature vector extracted by the feature extraction module 233 from the positive and negative training subsets produced by the partitioning module 231 as input to a training algorithm, which trains the corresponding video classifier. In one embodiment, the training algorithm is AdaBoost, the details of which are known to one having ordinary skill in the art. In other embodiments, other training algorithms such as linear support vector machine (SVM) are used. Once trained, each classifier $c_i$ is capable of taking the features of an arbitrary video $V_j$ as input and outputting a degree of similarity between that video $V_j$ and the video $V_i$ associated with the classifier $c_i$.

The classifiers may be understood to represent a set of values in a feature space defined by the extracted features. In one embodiment, the entries in the classifier indicate the weights corresponding to the feature represented by the entry. The product of applying a classifier for video $V_i$ to a feature vector of a $V_j$ is a score representative of a combination of the weights associated by video $V_i$ with the values of each feature present in video $V_j$. The combination may be an inner product, or similar computation that yields a scalar score. The higher the score the more similar video $V_j$ is to video $V_i$.

The classifier training module 233 further quantifies the accuracy of the classifiers by applying each classifier to its corresponding validation set. Thus, in one embodiment, each classifier is applied to each video in the validation set (or some smaller subset thereof), and the output of the classifier, and whether the video is in the positive or negative validation set, are used to determine whether the classifier's similarity determination was accurate. Specifically, if the output produced by the classifier is not already Boolean—directly indicating whether or not the video represents the location—it may be mapped to a Boolean value.

For example, in embodiments in which the classifiers produce real number scores indicating a degree of match strength, the real numbers can be compared to some predetermined threshold, such as 0.94 on a scale of 0.0 to 1.0, to determine whether the similarity is sufficiently strong to constitute a match, with numbers greater than the threshold indicating a match, and lesser numbers indicating a failure to match.

If a classifier produces output indicating that a video is sufficiently similar to the video associated with the classifier, and the video is in fact in the positive training set, the classification is considered a true positive classification (TP). Similarly, a classifier output indicating that a video in the negative validation set is in fact similar is considered a false positive (FP); an output indicating that a video in the positive validation set is not similar is considered a false negative (FN); and an output indicating that a video in the negative validation set is not similar is considered a true negative (TN). An overall accuracy can then be determined for the classifier, with classifiers lacking sufficient accuracy being discarded. In one embodiment, the accuracy is considered sufficient only if the precision and recall of the classifier are both above predetermined values, such as 0.7, where the precision P is defined as P=TP/(TP+FP), and the recall R is defined R=TP/(TP+FN). In another embodiment, the accuracy is considered sufficient only if an F-score is above some predetermined threshold (e.g., 0.7), where the F-score is defined as a function of the precision and recall, F-score=2PR/(P+R).

The closeness determination module 210 takes the set of classifiers $\{C\}=c_i$ for i=1 to N, where N is the number of videos, and for each video $V_i$ corresponding to a classifier and returns a set of other classifiers $c_j$ that are closest to $c_i$. In the embodiment, the closeness of classifiers is defined in terms of closeness of Euclidean distance in feature space represented by the feature weights in the classifiers. Other measures of closeness of classifiers will be apparent to those skilled in the art.

In one embodiment, the closeness determination module 210 finds a set of K classifiers that are closest to the classifier $c_i$ for video $V_i$ in the feature space. These K classifiers correspond to a set of K videos. The module 210 then links the video $V_i$ to the videos corresponding to the K classifiers. The linking may be accomplished by adding the K videos to a list associated with video $V_j$. The number K may be specified by the video hosting service 100 beforehand or at run-time. In other embodiments, for a given video $V_i$, the closeness determination module 210 returns all the videos $V_j$ with classifiers $c_j$ located within a specified distance in feature space from the classifier of video $V_i$. The closeness determination module 210 may also create a graph in which videos with closely located classifiers are linked together.

The low rank approximation module 231 takes as input the set of classifiers $\{C\}$ and returns a corresponding set of low rank approximation of the classifiers $\{L\}$. Principle component analysis (PCA) or some other mathematical procedure may be used to provide the low rank approximation of each classifier. The low rank approximation of a set of classifiers may reduce the correlation among the set of classifiers and return a set of classifiers that are more uncorrelated that than the original set. In general, the output set of classifiers have a significantly lower dimensionality. Computations with the lower dimension output set of vectors are for at least these reasons faster than those with the original set of vectors.

Metadata Augmentation Using the Classifiers

The metadata generation module 220 is configured to adding metadata to a given video. The metadata generation module 220 can do this in a number of different ways.

1) Augmentation Using Classifier Textual Features

In one embodiment, for a given video $V_i$, the metadata generation module 220 takes the classifier $C_i$ associated with a video $V_i$ as input and determines which textual features are significant. It then adds the significant textual features as metadata to the video $V_i$, thus augmenting the metadata with the textual features from the classifier. This is beneficial as it takes the learned textual features from the videos $V_j$ related to video $V_i$, and adds them to $V_i$'s metadata.

Significance for a feature may be represented by the feature having the highest, or one of the highest, weight in the classifier $C_i$. In other embodiments, all the textual features that have weights in the classifier $C_i$ higher than a predetermined threshold have significance. Other methods will be apparent to those skilled in the art to determine from the classifier $C_i$ the textual features that are significant and may be added as metadata.

2) Augmentation Using Metadata from Videos Linked by Classifiers

In another mode of operation, For a given video $V_i$, the metadata generation module 220 takes the output from the closeness determination module 210, identifying a set of K classifiers $C_j$, j=1 to K, and accesses the K videos associated with these classifiers. These are the linked videos as mentioned above. From each of these K linked videos, the module 220 copies the textual metadata to the metadata for video $V_i$ (eliminating duplication as necessary). The transfer of metadata from linked videos may be for all of the textual metadata, or alternatively for only a portion of the textual metadata, such as the most significant textual metadata. The significant textual metadata for a video may be determined from the weights associated with the corresponding textual feature in the classifier for the video. Additionally, the module 220 can use a threshold to specify a number of textual features to be transferred in the order of priority. Other methods of transferring metadata from linked videos will be apparent to one skilled in the art.

Augmentation Method

Figure 3:
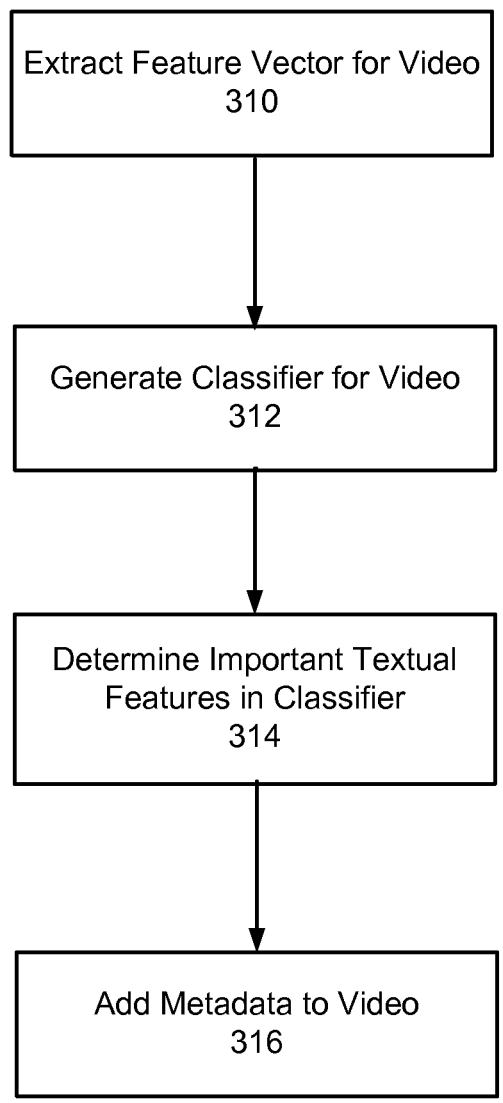
FIG. 3 is a flowchart illustrating a high-level view of a method for augmenting metadata of a video or other digital object based on the weights in the classifier, according to one embodiment.

FIG. 3 is a flowchart illustrating a high-level view of one method for augmenting metadata of a video or other digital object based on the weights in the classifier, according to one embodiment. The learning module 230 extracts 310 a feature vector for the video as discussed above. The learning module then generates 312 a classifier for the video. The learning module 230 may use the partitioning module 231 and classifier training 233 to generate the classifier. The metadata generation 220 determines 314 the significant textual features in the classifier as discussed above. It then adds 316 metadata to the video corresponding to the previously determined significant textual features.

The method of adding metadata described above may be used to add metadata corresponding to textual features that were absent in the initially extracted feature vector of the video but were determined to be significant based on the training set comprising positive subsets and negative subsets of videos. For example, a video of Lady Gaga performing in Los Angeles may not have the term 'dance' among its metadata. However, based on the training set comprising positive subsets and negative subsets of videos, 'dance' may acquire significance in the classifier for the video of Lady Gaga performing in Los Angeles, 'Dance' is then added to the metadata describing the video.

Figure 4:
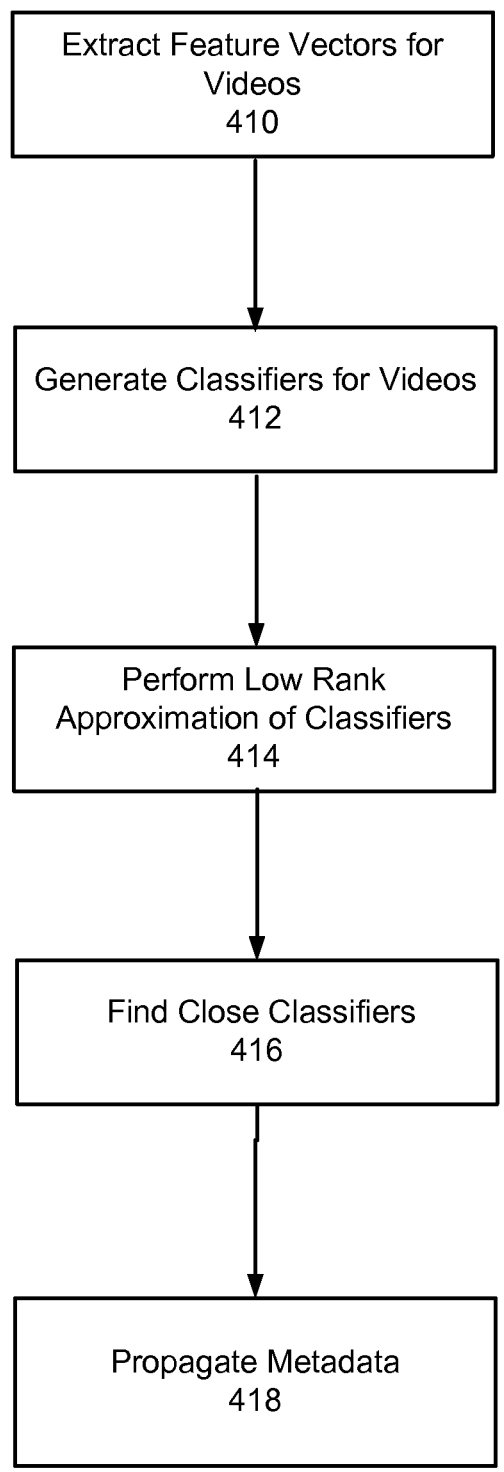
FIG. 4 is a flowchart illustrating a high-level view of a method for augmenting metadata, of videos or other digital objects based on the closeness of classifiers, according to one embodiment.

FIG. 4 is a flowchart illustrating a high-level view of a method for augmenting metadata of videos or other digital objects based on the closeness of classifiers, according to one embodiment. The learning module 230 extracts 410 a feature vector for each video as discussed above. The learning module 230 then generates 412 a classifier for each video. The learning module 230 may use the partitioning module 231 and classifier training 233 to generate the classifiers.

In some embodiments, the metadata augmentation system 119 may perform 414 a low rank approximation of the classifiers. The closeness determination module 210 then determines 314 close classifiers. The metadata generation module 220 propagates 418 the metadata of the videos with close classifiers.

The method of adding metadata described above may be used to add metadata corresponding to textual features that were absent in the initially extracted feature vector of the video but were associated with other videos with classifiers determined by machine learning to be close to each other. For example, a video of Lady Gaga performing in Los Angeles may not have 'dance' among its metadata. Accordingly, the classifier $C_{gaga}$ for this video video would not have "dance" as a significant feature. However, based on the classifier learning described above, a classifier $C_{spears}$ for a video of Britney Spears performing in the same concert may be found to be close to classifier $C_{gaga}$. Assume then that the video of Britney Spears has the additional metadata "pop" and "dance" associated with it. These two terms "pop" and "dance" can then be added to metadata describing for the Lady Gaga video.

A video $V_r$ recently uploaded to the video repository 116 may not have data to identify commonality in order to train its classifier on a training set of videos. A method of adding metadata to the video $V_r$ comprises extracting a feature set for the new video, determining a specified number of similar videos by applying the classifiers of other videos to the feature vector of video $V_r$, and learning the significant metadata from the specified number of similar videos. The learning of significant metadata from the specified number of similar videos may occur by transfer of significant metadata from the similar videos or transfer of textual features with significant weights in the classifier of the similar videos. Other possibilities to learn significant metadata from the specified number of similar videos will be apparent to one skilled in the art.

Applications of Augmented Metadata

These processes results in a robust set of augmented metadata for videos, which can then be used for various purposes. For example, the advertisement selection 152 may use the additional metadata to determine optimal advertisements for a given video.

Additionally, the augmented metadata can be used to better find objects of interest to a user, e.g., in response to a user query for objects having given properties that can be described by the metadata. For instance, the adjusted duster weights can act as one factor when evaluating user queries, thus influencing the query output.

As another example, the augmented metadata provides additional information and thus more descriptive feature vectors than that can be extracted from metadata by the feature extraction module 232. Thus, in one embodiment the video hosting service 100 extracts the metadata and uses them, either by themselves or in combination with other features, to train additional classifiers, such as concept classifiers for recognizing a particular concept, such as a particular sport, a particular genre of television show, and the like. In one embodiment, the video hosting service 100 trains concept classifiers by forming positive and negative training sets of videos for each of a set of possible concepts based in part on whether the video metadata contains a corresponding keyword. Additional details on training such concept classifiers based on metadata features are provided in, for example, U.S. patent application Ser. Nos. 12/822,727 and 12/874,015, which are hereby incorporated by reference.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates o an apparatus for performing the operations herein. This apparatus may be specialty constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to the illustrative, but not limiting, of the scope of the invention, which is set forth in the following claims.

What is claimed is:

1. A computer-implemented method of adding textual metadata to a given video, the method comprising:
   selecting a set of videos that are related to the given video;
   training a classifier for the given video using the set of selected videos, wherein the classifier includes a plurality of weighted features, including textual features;

determining from the classifier at least one significant textual feature; and adding the at least one significant textual feature to the metadata of the given video.

2. The computer-implemented method of claim 1, wherein the at least one significant textual feature comprises a plurality of significant textual features for a predetermined number of greatest weights in the classifier for the given video.

3. The computer-implemented method of claim 1, wherein the at least one significant textual feature comprises a plurality of significant textual features having weights in the classifier for the given video that are greater than a threshold.

4. The computer-implemented method of claim 1, further comprising:

identifying a plurality of classifiers corresponding to a plurality of other videos, wherein each of the identified classifiers is close to the classifier for the given video; and linking the given video to a plurality of other videos corresponding to the plurality of classifiers.

5. The computer-implemented method of claim 4, the linking further comprising:

determining significant metadata associated with each of the linked videos;

adding the significant metadata associated with the linked videos to the metadata of the given video.

6. The computer-implemented method of claim 5, wherein the significant metadata correspond to textual features for a predetermined number of greatest weights in the classifiers for the linked videos.

7. The computer-implemented method of claim 5, wherein the significant metadata correspond to textual features having weights in the classifiers for the linked videos that are greater than a threshold.

8. The computer-implemented method of claim 4, wherein the classifier of a first video is close to the classifier of a second video if a distance between the classifier of the first video and the classifier of the second video is smaller than a threshold.

9. The computer-implemented method of claim 4, wherein the plurality of classifiers corresponding to the plurality of other videos are fewer than a specified number of classifiers.

10. The computer-implemented method of claim 4, wherein the closeness of any two classifiers is based on Euclidean distance between the classifiers.

11. The computer-implemented method of claim 4, further comprising prior to linking the given video to the plurality of other videos, obtaining a low rank approximation of each classifier of the plurality of classifiers.

12. The computer-implemented method of claim 11, wherein the low rank approximation of the classifiers is obtained through principle component analysis.

13. The computer-implemented method of claim 1, further comprising selecting an advertisement for display in conjunction with the given video based upon the added at least one significant textual feature.

14. A non-transitory computer-readable storage medium for adding textual metadata to a given video and comprising instructions including:

instructions for selecting a set of videos that are related to the given video;

instructions for training a classifier for the given video using the set of selected videos, wherein the classifier includes a plurality of weighted features, including textual features;

instructions for determining from the classifier at least one significant textual feature; and instructions for adding the at least one significant textual feature to the metadata of the given video.

15. A computer system for adding textual metadata to a given video, the computer system comprising:

a computer processor configured to execute instructions; and a non-transitory computer-readable storage medium comprising instructions executable by the computer processor, the instructions comprising:

instructions for selecting a set of videos that are related to the given video;

instructions for training a classifier for the given video using the set of selected videos, wherein the classifier includes a plurality of weighted features, including textual features;

instructions for determining from the classifier at least one significant textual feature; and instructions for adding the at least one significant textual feature to the metadata of the given video.

\* \* \* \* \*